United States Patent
Kantola et al.

[11] Patent Number: 5,963,634
[45] Date of Patent: Oct. 5, 1999

[54] METHOD FOR WARMING UP A SPARE PROCESS IN A REPLICATED REAL-TIME SYSTEM, IN PARTICULAR IN A TELEPHONE EXCHANGE

[75] Inventors: Raimo Kantola; Eeva Hartikainen, both of Helsinki, Finland

[73] Assignee: Nokia Telecommunications OY, Espoo, Finland

[21] Appl. No.: 08/782,927
[22] PCT Filed: Jul. 10, 1995
[86] PCT No.: PCT/FI95/00399
§ 371 Date: Jan. 13, 1997
§ 102(e) Date: Jan. 13, 1997
[87] PCT Pub. No.: WO96/02115
PCT Pub. Date: Jan. 25, 1996

[30] Foreign Application Priority Data
Jul. 12, 1994 [FI] Finland ..................................... 943328

[51] Int. Cl.⁶ ............................. H04M 3/00; G06F 11/20; G06F 15/177; H04Q 3/545
[52] U.S. Cl. ........................... 379/279; 364/132; 364/187; 379/10; 379/15; 379/269; 395/182.1; 395/200.78; 707/204
[58] Field of Search ..................................... 379/269, 279, 379/1, 9, 10, 11, 15, 37; 364/132, 187; 395/182.1, 200.78; 707/204

[56] References Cited

U.S. PATENT DOCUMENTS

| | | | |
|---|---|---|---|
| 4,371,754 | 2/1983 | De et al. ................................ | 379/15 X |
| 4,466,098 | 8/1984 | Southard ............................. | 379/279 X |
| 4,633,039 | 12/1986 | Holden ................................ | 379/279 X |
| 5,369,759 | 11/1994 | Kanbe ................................. | 379/279 X |
| 5,469,503 | 11/1995 | Butensky et al. ....................... | 379/265 |

FOREIGN PATENT DOCUMENTS

| | | |
|---|---|---|
| 260 625 | 3/1988 | European Pat. Off. . |
| 517 446 | 12/1992 | European Pat. Off. . |
| 601 853 | 6/1994 | European Pat. Off. . |
| 912669 | 5/1992 | Finland . |

OTHER PUBLICATIONS

Raimo Kantola; New fault–tolerance design: developments in software system architecture of the Nokia DX 200; Discovery; 1991; pp. 32–39 vol. 22.

Primary Examiner—Harry S. Hong
Attorney, Agent, or Firm—IP Group of Pillsbury Madison & Sutro, LLP

[57] ABSTRACT

The invention relates to a method for warming up a spare process in parallel with an active process in a replicated real-time switching system, in particular in a telephone exchange. The switching system comprises an active control unit (WP) having, permanently or when necessary, a replicating hot-standby spare unit (SP) connected to a common internal message bus, so that the spare unit performs the same processes as the active control unit in parallel. In accordance with the invention, the operation of the active process ($\sigma^{WO}$) to be replicated is temporarily frozen in the active control unit (WP) when the process has no tasks to be performed, the other processes of the active control unit simultaneously being kept in operation. After this a spare process ($\sigma^{SP}$) is created to the spare unit (SP), and the state data ($\sigma^{WO}$) of the active process is loaded into the spare process. Provided that no new tasks have come in during this time to the active process ($\sigma^{WO}$), the warm-up is found successful. The warm-up is found failed if new tasks have come in.

14 Claims, 2 Drawing Sheets

METHOD FOR WARMING UP A SPARE PROCESS IN A REPLICATED REAL-TIME SYSTEM, IN PARTICULAR IN A TELEPHONE EXCHANGE

This application is the national phase of international application PCT/FI95/00399, filed Jul. 11, 1995 which designated the U.S.

FIELD OF THE INVENTION

The invention relates to a method for warming up a spare process in parallel with an active process in a replicated real-time system, in particular in a telephone exchange, the system comprising a control means that comprises at least one active control unit having, permanently or when necessary, a replicating hot-standby spare unit so that the spare unit performs the same processes as the active control unit in parallel.

BACKGROUND OF THE INVENTION

Distributed computer systems have recently been implemented in the control systems of public switched telephone exchanges. The control of a telephone exchange is then distributed to several computers, which are connected with a relatively high-speed bus or equivalent transmission means. In telephone exchanges or other switching systems of this type, an effort is made to support system operations by replicating at least part of the distributed control computers. This should enable replication of the control computers in a way that does not unreasonably consume the performance capacity of the control computers, or require costly special equipment. Requirements for the replication of distributed computers in a telephone exchange environment are disclosed in the article "New fault-tolerance design: developments in software system architecture of the Nokia DX 200", Raimo Kantola, Discovery, Volume 22, First Quarter 1991, pp. 32–39.

The following solutions, for example, have previously been employed in the replication procedures of distributed computer systems. In a solution utilizing microsynchronization of computers, for instance, two computers controlled by special equipment execute precisely the same computer instructions at precisely the same moment. The advantage of the microsynchronization method is its transparency to the application software. Its disadvantage is the costliness of the special equipment and the difficulty, even impossibility, of effectively applying the method to N+1 supported computers, particularly when N is at least several dozen. In the N+1 redundancy mode, N similar computers perform similar, yet independent useful tasks using the same software. One computer is a spare unit to be taken into use if one of said N computers fails, or for example, when the operational arrangements of the switching system so require. The advantage of the N+1 equipment redundancy method is its cost-effectiveness and its compatibility with the 2N method, with the difference that the connection of the spare unit to the active unit must always be carried out prior to unit changeover.

Solutions have previously also been implemented in which the redundant execution of the entire control has been left in charge of the application software, so that the state automaton of the program has comprised the necessary state transitions for keeping the spare unit up-to-date with that which is executed by the active computer. The drawback of this replicating method is that the application must solve two problems at a time: its actual task, and the support therefor. This complicates the development of applications. Another drawback is that this replication method does not result in a uniform execution, as a result of which the maintenance of the applications is costly.

Methods shielding the replications from the applications have also been developed previously, and these have aimed at correctness of computation in all performing computers, and they have therefore been heavy and consumed the performance capacity of the computers. These solutions have given the correctness of the performance a priority over the availability of the system. Therefore they are not particularly suitable for a switching environment, such as a telephone exchange, where high availability is more important than absolute correctness of every discrete minor function.

A replication method is known from Finnish Patent application 912669 in which the processes performed by two or more computers operating in parallel are replicated in groups containing as many subprocesses as possible, so that the corresponding subprocesses within the corresponding groups of two units operating in parallel operate independently (asynchronously) of each other, but there is no inconsistency between the processes performed by the parallel subprocesses. This method is based on multicast message handling between the processes where the information vital to the processing and transmitted between the processes of the master unit is simultaneously also delivered to the corresponding processes of the spare unit operating in parallel. In that case, computers that operate in parallel execute the same program virtually simultaneously, so that the computers externally seem to transmit and receive the same messages in the same order. The method does not aim to guarantee the instantaneous correctness of two executions, but that the operation executed by computers operating in parallel is not inconsistent with the operation executed by the master computer of the group. This reduces the load caused to the computers by replication without a need for any special equipment, except a data transmission bus connecting the computers, which is required for a distributed switching system in any case.

In a prior art message-based replication method of this type, a hot-standby process must initially be created in parallel with the active process to be replicated, and the hot-standby process must be brought to the same dynamic state as the active process to be replicated. On the level of computer units this means taking the spare unit out of the cold-standby state to the hot-standby state by first bringing the spare unit to a so-called initial steady state and further to a state which is consistent with the active unit. The initial steady state is achieved by loading the appropriate program codes and data files into the spare unit and by initiating the master processes. In this initial state, all stateless processes are already in the actual operative state. Instead, all state-oriented processes must further be brought from the initial steady state to a state which is consistent with the active unit. This procedure is termed a warm-up procedure of a process or a computer unit. The warm-up procedure may be passive or active. The passive warm-up refers to creating new computations as replicated computations, and with time, the number of equivalent computations in the spare unit comes closer and closer to the total number of the parallel computations in the active unit. The passive warm-up procedure, however, does not give any guarantee of that the spare unit will ever reach a consistent state with the active unit, i.e. that the passive warm-up procedure will end successfully, and the passive warm-up procedure does not provide any final criterion for the warm-up process either. For this reason, and since the passive warm-up may last too long, the active warm-up is needed.. The active warm-up refers to a procedure in which the current values of the state variables of the state-oriented processes of the active unit are copied to the corresponding state variables of the spare unit. The active warm-up procedure also provides a criterion for that when the warm-up has terminated successfully.

A number of demands are made on the active warmup. Warm-up procedures should be applicable to all or at least the most of the applications for cloning the dynamic state of the active computations, i.e. transferring the computations to the spare unit without stopping the active computation controlled by external processes in the master unit. The warm-up procedures should be as transparent as possible to the applications. In addition, the warm-up procedures should cause as little disturbance as possible to the operation of the active unit, and they must never cause errors in the computations of the active unit, and they should end once the spare unit has reached a consistent state.

SUMMARY OF THE INVENTION

The object of the present invention is a warm-up method that meets the requirements mentioned above. This is achieved with a warm-up method of the type set forth in the introduction, which is characterized in accordance with the invention by temporarily freezing the operation of the active process or a larger group of processes to be replicated in the active control unit when it is detected that none of the processes in the group of processes has a task that could be assigned to be performed by the process when control units are released from other tasks, simultaneously keeping other processes of the active control unit in operation, recording the task requests incoming during the freezing state of the active process in the task request queue of the process, collecting the state data to be sent, sending the collected state data to the spare unit in one or more batches, creating a spare process for the active process in the spare unit, loading the state data contained by the first batch of state data to the spare process sending an acknowledgement to the active control unit, checking that the active process still does not have any task requests and finding the freezing successful if there are no task requests, and finding the freezing failed if there are task requests.

A second embodiment of the method of the invention is characterized by temporarily freezing the operation of the active process or a larger group of processes to be replicated in the active control unit simultaneously keeping other processes of the active control unit in operation, sending the copies of the task requests in the queue of the active process to the spare unit, and recording in the active unit which task requests have been sent, recording the task requests incoming during the freezing state of the active process in the task request queue of the process, collecting the state data to be sent, and sending it to the spare unit in one or more batches, creating a spare process for the active process in the spare unit, loading the state data contained by the first batch of state data to the spare process, loading said copies of the task requests to the task request queue of the spare process in the same order as where they were in the task request queue of the active process, sending an acknowledgement to the active control unit, checking that no new task requests have come in to the active process in addition to those the copies of which were sent to the spare unit, finding the freezing successful if no new task requests have not arrived, and finding the freezing failed if new task requests have arrived.

In the invention, a component of the spare unit that is warmed up at a time is termed a warm-up entity or group. It would be ideal if a warm-up entity were a single process. In the worst case, all the processes of the spare unit may be included in the same warm-up entity. Since the content of the warm-up entity may not change during the warm-up, the latter case means that a warm-up would be impossible without stopping the computation for a long time. In the present invention, which functions in a message-operated replication system, the operation of the active process or a larger group of processes that forms a warm-up entity and is to be replicated is temporarily interrupted (frozen) in the active control unit. In one embodiment of the invention, it is regarded as a criterion for freezing that it may be found on the basis of the kernel state of the process group that none of the processes has a task that could be assigned by the kernel to be performed by the process once the computer is released from other tasks. In a system based on message handling, the fact that the process has no tasks may be detected from e.g. that the queue of incoming messages of the process is empty. Other kernel states (variables) are e.g. the communication state of the process and the running state of the process (waiting for tasks, ready to run, running, etc.). However, those other processes of the active unit that are not included in this warm-up entity are simultaneously kept in normal operation. A process in the freezing state is normal from the point of view of other processes, and they can send messages to it. A process in the freezing state does not, however, perform one single operation, but the messages incoming to it are taken to the queue of incoming messages of the process from where they are taken to be handled by the process, until the freezing state terminates. Since in the invention it is endeavoured to direct the warm-up process to a small idle group of the processes of the active unit, i.e. to those which have no incoming messages to be handled, the operation of the active unit may continue practically normally. The only disturbance that may be detected in the other operation of the active unit is delaying in handling the messages possibly arriving in the queue of messages of the frozen unit.

A pre-requisite for a successful warm-up process is that the state data of the active process does not change while it is being transferred to the spare process. In one embodiment of the invention, this is ensured so that the queue of the incoming messages of the active process must remain empty or unchanged, so that the warm-up is found to be successful. If the queue does not remain empty or unchanged, the warm-up fails and the spare process is returned to an initial steady state, and the active process is returned from the freezing state. If an empty incoming message queue of the active process is not a pre-requisite for starting the freezing, in one embodiment of the invention the consistency of the message queue of the spare process and the invariability of the message queue of the active process are guaranteed by copying the message queue of the active process to the message queue of the spare unit at the start of freezing and by marking the copied messages. If new messages come in to the message queue of the active process before the spare process indicates it is self capable of receiving messages to the message queue, the warm-up is found failed. It is possible, however, to allow reception of messages to the queue also in the frozen state after a corresponding queue of arriving messages has also been created for the spare process. The arrangement of the invention only ensures that no single message that has arrived in the message queue of the active process is lost during the time between freezing the active process and the spare process and creating a message queue for it. The warm-up method of the invention is characterized by being suitable in a real-time environment, since no rollback of the tasks from the checkpoint to the current state is required to be carried out by the spare unit. The consistent state is copied to the spare unit from the active unit in accordance with the order of warm-up. The spare unit does not perform again the tasks performed earlier by the active unit, in order to become updated.

Owing to the real-time requirements, data can be transmitted from one process to another and recorded in the main memory files, i.e. files that are located in the memory of the computer all the time. These files may have a copy in the permanent memory e.g. on a disk. However, this is not always the case if the file contains rapidly changing data on the state of the system. The main memory files are demonstrated with a model of a set of data units. Each data unit is a model of a set of variables in some main memory file. The data units differ from the own variables of the processes so that they are not necessarily tightly bound with one process, but for example: A) some subset $D_1$ of data units may be read by all processes, B) the values of some set $D_2$ of data units are written by one process and read by another one. If the data units are not used for data transmission from one process to another, the data units may be considered equal to the variables of the actual writing process and warmed up along with the process.

If data units are used for data transmission from one process to another, the warm-up order is defined between the processes so that the reader processes are warmed up subsequent to warming up the writer process and the data units. This ensures that the state data inconsistent with the active unit can not spread through the data units during the warm-up.

In one embodiment of the invention, subsequent to a successful warm-up of the state data, a transfer of separate data units connected with the active process is carried out when necessary from the active control unit to the spare unit. These separate data units are such that are not used for changing the process state variables or create a content for such an internal message that is sent to another process. Separate data units of this kind may in a real-time switching system be e.g. statistics and charging data collected in the producer or consumer context of the service. A pulse counter file of a large group of subscribers, for instance, is so large that it cannot be warmed up as one entity, but it can be divided into a set of separate data units. Each data unit transmits data as an independent unit. Pulse counters and other counters are state variables, collecting statistical data to a target is constant state-oriented computation. One process carries out collecting the data to the target group, but the computational operations of the different targets have nothing to do with each other.

In accordance with the invention, a transfer of separate data units of this kind comprises the steps of:

recording in the spare unit the current value of a separate data unit to be transferred, requesting the active control unit to send said separate data unit to the spare unit, reading said separate data unit in the active control unit and sending it to the spare unit, ensuring that no writing actions directed to the data unit have occurred during the transfer phase, by comparing the current value of the data unit in the spare unit with said recorded value, and if the current value and the recorded value of the data unit are equal, writing the value of the data unit received from the active control unit as the current value of the data unit of the spare unit, if the current value and the recorded value of the data unit are different, defining the transfer as failed, and rejecting the value of the data unit received from the active control unit.

The present invention thus enables copying of files which are in a limited use from the active unit to the spare unit, so that the applications of the active unit may continue updating the data while copying is going on. A conflict arises only if such data is updated in the active unit that is simultaneously being copied to the spare unit to be warmed up. In addition, by recording a non-updated value of the data unit in the spare unit prior to searching the correct value of the data unit from the active unit, and after this, by writing the searched value to the spare unit only if the value in the spare unit has not changed for another reason during the search, conflicts may be detected and copying false data may be prevented. Detecting is based on the fact that the same external operations are directed to the spare unit and to the active unit. If the value of the data unit in the spare unit changes during the search, and thus deviates from the value recorded prior to the search, the searched value is supposed to be false and warming up is interpreted to be failed. The invention enables replication and in general, use of large files containing plenty of dynamic data in a real-time system, so that the active unit may continue performing the normal tasks while copying is taking place. Files of this kind are well suited for collecting pulse counters, which are numerous in a telephone exchange. Now the effective warm-up method does not limit their use.

BRIEF DESCRIPTION OF THE DRAWINGS

The invention will now be described in greater detail by means of preferred embodiments with reference to the accompanying drawings, in which.

PREFERRED EMBODIMENTS OF THE INVENTION

Figure 1:
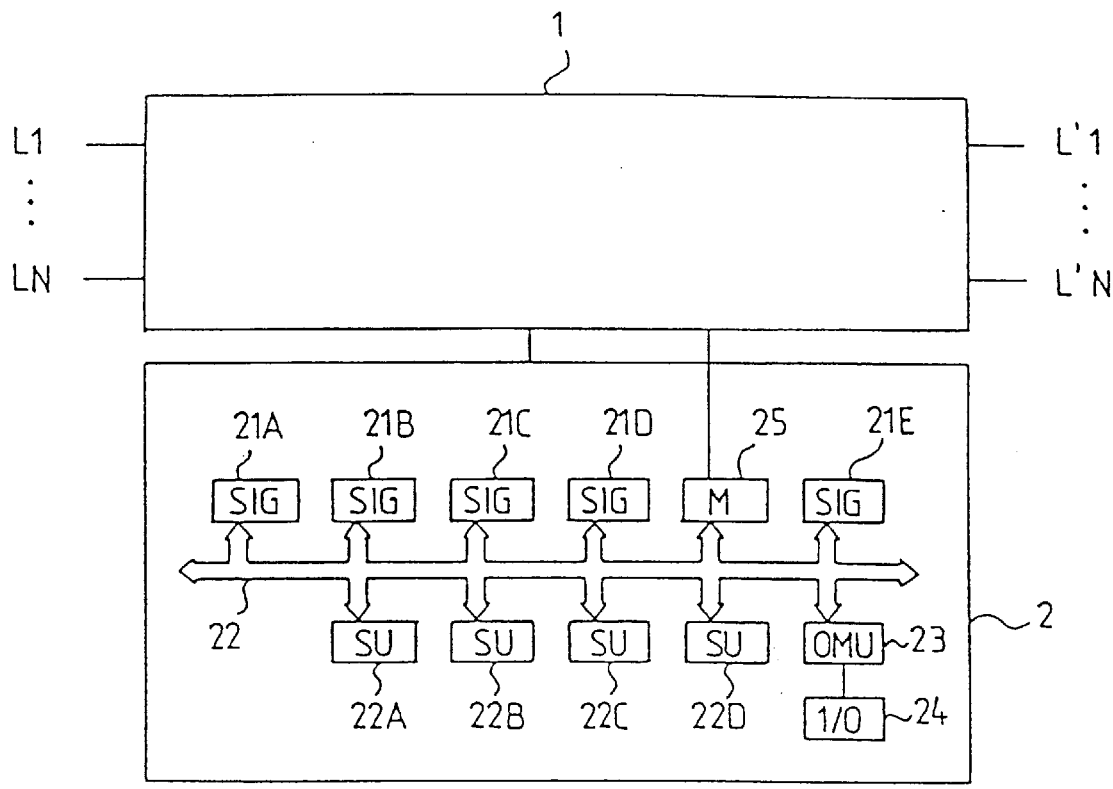
FIG. 1 is a block diagram of a telephone exchange in which the method of the invention may be applied.

In the following, the invention will be described in connection with a digital telephone exchange, but the warm-up method of the invention may also be applied in any other replicated real-time system, particularly in transmission technical switching facilities of the same type in which connections are switched between transmission channels. In FIG. 1, the controlled object is a switching element or switching field 1, which is controlled by a functionally distributed control element 2 in which mainly the generic unit types are shown. The switching element 1 may contain a switching matrix as well as necessary signalling and speech processing equipment. The switching element 1 switches, under the control of the control element 2, connections between a first group of transmission channels or lines, L1 . . . LN, and a second group of transmission channels L'1 . . . L'N.

In the control element 2, the control functions have been distributed to several microprocessor units 21A–21E, 22A–22D, 23 and 25, interconnected by a high-speed parallel message bus. Instead of a message bus, any other suitable data transmission means can be used for the internal data transmission of the control element 2.

FIG. 1 shows two functionally dedicated control computer types, namely a marker 25 for the switch control and an operations and maintenance unit 23. Furthermore, different signalling units (SIG) 21A–21E and service function units (SU) 22A–22D are shown.

At least one of the signalling units 21 is allocated for incoming call processing, and thus its functions comprise at least processing of incoming signalling, control of incoming calls, call charging and resource management. Resources refer herein to for instance traffic channel time slots, call identifications and connections.

At least one of the signalling units 21 operates the signalling of an outgoing call, and it thus comprises outgoing call control and processing of outgoing signalling.

The marker 25 comprises handling of the connections.

One or more of the service units 22 comprises program blocks for subscriber, line, trunk, and routing data retrieval services. Furthermore, one or several service units may contain collection functions for call statistics and charging data.

At least some of the above stated computers are supported by replicating the functions, i.e. by using in parallel two or more computer units that virtually execute the same processes simultaneously. The invention will be explained in the following by way of example in connection with such a case where in parallel with an active control unit, another control unit operates as a spare unit on the hot-standby principle, so that it can immediately be taken into use where necessary, in case of failure of the active unit. Such a replication principle is termed the 2N method. However, the invention is also intended to be applied in connection with the N+1 replication scheme, where in case of the control unit changeover the only spare unit must first be brought into the hot-standby state along with the unit to be replaced prior to being taken into use. The final situation then corresponds to the 2N redundancy scheme.

Figure 2:
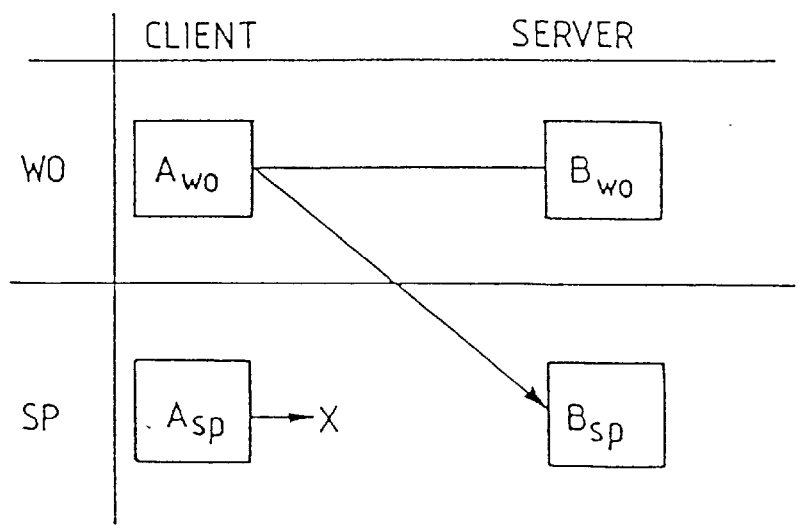
FIG. 2 is a diagram illustrating data transmission between replicated process blocks.

In a preferred embodiment of the invention, a system replicated by means of a so-called multicast principle is applied, said system being described in Finnish Patent application 912669. In the multicast method, the subprocesses of the switch control process to be executed for a certain call or connection are carried out in relative asynchronous groups, which transmit messages to one another via a data transmission bus, such as bus 22. The corresponding subprocesses of the spare unit form similar spare groups which are also capable of sending messages via the data transmission bus 22. The subprocess groups in the active unit WO and the supporting spare group in the spare unit SP are asynchronous in relation to each other, so that the subprocesses corresponding to one another within these groups are executed independently. The subprocesses within a group communicate directly with each other, and the groups send messages to each other via a common data transmission bus 22. FIG. 2 shows two active processes $A_{WO}$ and $B_{WO}$, which are located in the active control unit WO and both composed of one ore more subprocesses. Accordingly, in the spare unit SP there are replicating spare processes $A_{SP}$ and $B_{SP}$, respectively. In FIG. 2, the active process $A_{WO}$ sends the other active process $B_{WO}$ a message that contains e.g. information on switching the call. The spare process $A_{SP}$ has also formed the same switching information. However, the result of the process $A_{WO}$ will not be utilized in future, but the switching information of the process $A_{WO}$ is sent in accordance with the multicast principle both to the active process $B_{WO}$ and the spare process $B_{SP}$. It is thus ensured that the processes $B_{WO}$ and $B_{SP}$ continue the control process independently, but with the same initial information. The multicast principle is described in greater detail in Finnish Patent application 912669.

As it has been explained previously, the spare process must be brought from the cold-standby state to the initial steady state by loading the necessary program code blocks and data files, and by initiating the master processes, and further, by means of the active warm-up procedure, from the initial steady state to the state consistent with the active process, by copying the current values of the state variables of the state-oriented processes of the active unit to the corresponding state variables of the spare unit. Dynamic state data, which may be transferred from the active unit to the spare unit, may contain the state variables of the processes, process control information, active time counters etc. As stated above, the active warm-up procedure should cause as little disturbance as possible to the normal operation of the active unit, and it should never cause errors in the operation of the active unit.

Figure 3:
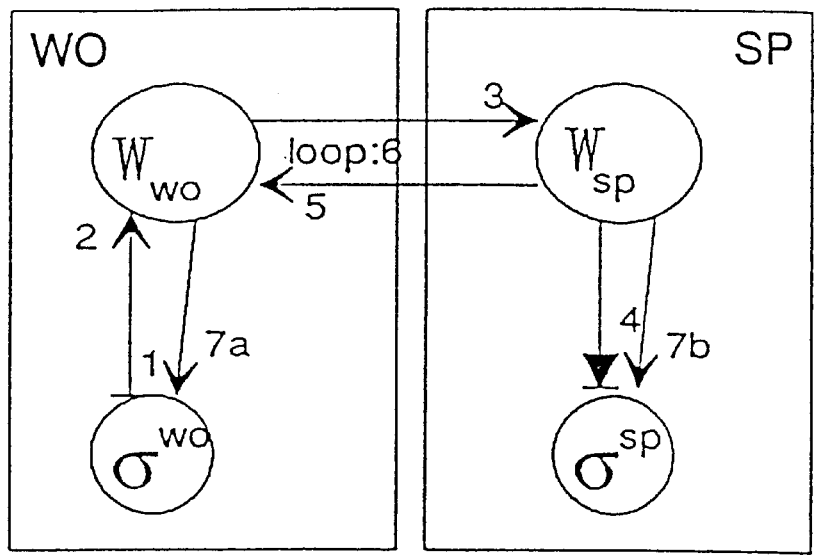
FIG. 3 illustrates the active warm-up of the process in accordance with the invention.

These and the other advantages set out previously are achieved with the warm-up method of the invention, the first preferred embodiment of which will be explained in the following as an example with reference to FIG. 3. FIG. 3 shows an active unit WO and a spare unit SP. The replicated process to be warmed up is marked in the active unit as $\sigma^{WO}$ and in the spare unit as $\sigma_{SP}$. The warm-up procedure is performed by a kernel program block, which is marked in the active unit as $W_{WO}$ and in the spare unit as $W_{SP}$. During the performance of the warm-up procedure other processes of the active unit WO and the spare unit SP proceed normally.

In a preferred embodiment of the invention, the starting conditions for the warm-up procedure are the following:

1) $\sigma^{WO}$ is executing the receive phase, 2) the incoming message queue of process $\sigma^{WO}$ is empty, 3) process $\sigma^{WO}$ has not prohibited the warm-up, 4) process $\sigma$ has not been warmed up yet.

In principle, the warm-up process of the invention proceeds as follows:

In step 1 of FIG. 3 process $\sigma^{WO}$ is frozen, i.e. the performance of the process is temporarily interrupted. The process in the freezing state exists for the other processes in the active unit and they can send messages to it. However, the frozen process $\sigma^{WO}$, does not execute one single row of program codes, and the kernel puts the incoming messages to the incoming message queue of process $\sigma^{WO}$. Process $\sigma^{WO}$ will process these messages when the freezing state terminates.

In step 2 of FIG. 3 the state data is collected on the warm-up entity a part of which process $\sigma^{WO}$ is.

In step 3 of FIG. 3 this collected state data is sent from the active unit WO to the spare unit SP. This first message also contains a freeze command to the spare process $\sigma^{SP}$.

In step 4 of FIG. 3 process $\sigma^{SP}$ is created, the created spare process is frozen, and the state data included in the message received from the active unit WO is written in the spare process $\sigma^{SP}$. The communication state of the spare process $\sigma^{SP}$ is set to the state "reachable", and, in the same way as in the case of the active process, the frozen spare process $\sigma^{SP}$ will exist after step 4 for the other processes of the system, and they can send messages to it. The kernel puts all messages incoming to the frozen spare process $\sigma^{SP}$ to the incoming message queue of the spare process $\sigma^{SP}$ for later processing.

In step 5 of FIG. 3 an acknowledgement is sent from the spare unit SP to the active unit WO.

In step 6 of FIG. 3 the incoming message queue of the active process $\sigma^{WO}$ is checked. During steps 2–5 described above the incoming message queue of the active process $\sigma^{WO}$ must remain empty. The reason for this is that a copy of the same message may have been lost in the spare unit SP before the spare process $\sigma^{SP}$ has been created in step 4.

If in step 6 of FIG. 3 the incoming message queue of the active process $\sigma^{WO}$ has remained empty, the freezing was successful.

If in step 6 of FIG. 3 the incoming message queue of the active process $\sigma^{WO}$ contains one single message, the warm-up fails, and a message reporting the failure is sent from the active unit WO to the spare unit SP, in which the spare process is returned to its initial state. The active process $\sigma^{WO}$ is defrozen and it may continue processing, starting from the messages that have come in to the message queue during the freezing. The kernel process W will make a new effort for warming up the process $\sigma$ later.

If the freezing was successful, but not all of the data could be sent in the first message in step 3 of the procedure, the additional data will be sent to the spare unit SP in consequent messages, this data is written in the spare unit SP and every message is acknowledged. During the transfer of these subsequent state data messages the messages incoming to process $\sigma$ are buffered into the incoming message queue both in the active process $\sigma^{WO}$ and the spare process $\sigma^{SP}$. Thus, the queues remain consistent (from step 4 onwards) if the message-based replication principle does not fail in any other respect. As a result of this, the queues of the processes $\sigma^{WO}$ and $\sigma^{SP}$ do not have to remain empty during the freezing when additional messages containing state data are being sent.

In step 7a of FIG. 3 it is found that there is no more state data to be sent, and the active process $\sigma^{WO}$ is thus defrozen, and it is given a status according to which it is in the replicated mode.

In step 7b when the state data of the last data message is written, the spare process SP is defrozen and it is given a status according to which it is in the replicated mode.

Steps 1–7 must be performed with a high priority for minimizing disturbances caused to the applications and for maximizing the chances of succeeding. However, the overall procedure for all of the processes must be run in the background of the applications, so that the applications can proceed between the warm-ups of the warm-up entities. As a result of this, the following rule for the priorities must hold:

warm-up entity selection≦applications≦warm-up of an entity.

In a second embodiment of the invention, the fact that the incoming message queue of the active process is empty, is not the criterion for initiating the warm-up. Instead, copies of the task requests of the messages in the task queue of the process or a larger group of processes to be replicated are sent to the spare unit SP and it is recorded in the active unit WO, which messages have been sent. Subsequent to this, it is proceeded in the same way as in the embodiment of FIG. 3, with the exception that in step 5 said message copies are also recorded in the incoming message queue of the created spare process $\sigma^{SP}$ in the same order as where they were in the message queue of the active process $\sigma^{WO}$. After this an acknowledgement is sent in accordance with step 5 in FIG. 3, and in step 6 the incoming message queue of the active process $\sigma^{WO}$ is checked. In other words, it is checked that no new messages have come in to the active process $\sigma^{WO}$ in addition to those the copies of which were sent to the spare unit. The freezing is thus found successful if no new messages have arrived, and it is found failed if new messages have arrived. Subsequent to this, it is proceeded as in the embodiment of FIG. 3.

The warm-up procedure described above is suited to be used as such when the total amount of data in a warm-up entity including process $\sigma$ and all its data units is not too large. If large groups of data units are connected with process $\sigma$, transferring all the data at a time takes too much time from the point of view of the real-time applications. Consequently, so-called separate data units, which were defined previously in this application, are transferred at a different moment subsequent to the above described warm-up in smaller groups.

Figure 4:
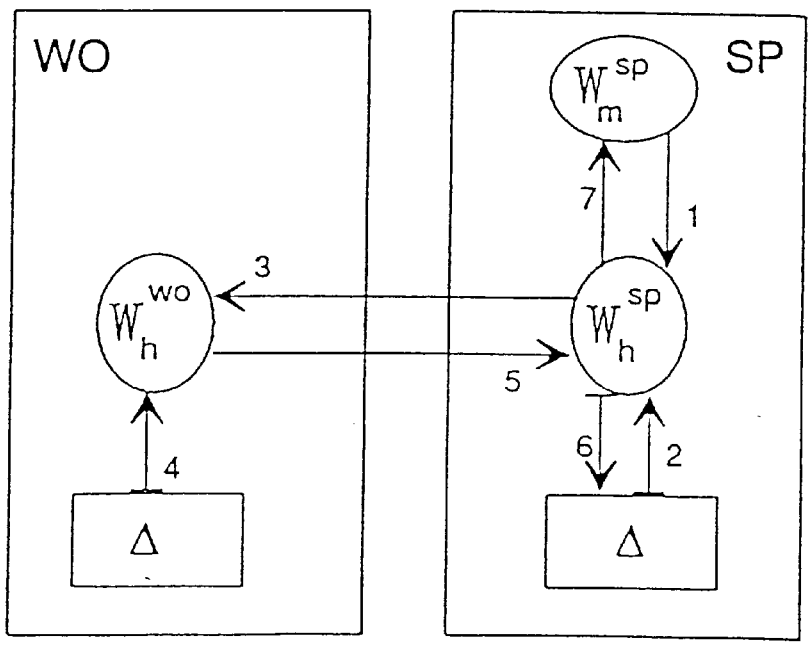
FIG. 4 illustrates the warm-up of separate data units in accordance with the invention.

In the following, the warm-up procedure of separate data units in accordance with the preferred embodiment of the invention will be described with reference to FIG. 4. FIG. 4 shows the following blocks:

$W_m$ is a kernel master process responsible for the warm-up of the file, $W_m^{SP}$ is a counterpart of process $W_m$ in the spare unit SP $W_h^{WO}$ and $W_h^{SP}$, correspondingly, are auxiliary processes of the active unit WO and the spare unit SP performing the warm-up of the file, $\Delta = \{d_i | i=1, \ldots, N\}$, is a group of separate data units to be warmed up, $\sigma$ is a process the group of data units is connected with.

Before the warm-up of the data units starts, process $\sigma$ has first been warmed up in the way described above in connection with FIG. 3. After this, the warm-up procedure proceeds as follows:

in step 1 of FIG. 4 the kernel process $W_m^{SP}$ of the spare unit SP requests its auxiliary process $W_h^{SP}$ to warm up data unit $d_i$, which may be transferred in the message.

In step 2 of FIG. 4, $W_h^{SP}$ records the data unit to be warmed up. This recorded data is assumed to be in an inconsistent state with the corresponding data unit of the active unit. The recorded content is marked as $v(d_i^{SP})=u_{sav}$.

In step 3 of FIG. 4, $W_h^{SP}$ requests the auxiliary process $W_h^{WO}$ of the active unit to send the data unit $d_i$ in question.

In step 4 the auxiliary process $W_h^{W}$ reads the data unit from the active unit and sends data unit $d_i$ to the auxiliary process $W_h^{SP}$ of the spare unit SP in step 5.

In step 6 of FIG. 4 the auxiliary process $W_h^{SP}$ of the spare unit SP reads from the spare unit SP the current value $u_{cur}$ of data unit $d(d_i^{SP})$ and compares it with the recorded value $u_{sav}$. If $u_{sav}=u_{cur}$, data unit $d_i$ received from the active unit WO is written in the group of separate data units in the spare unit SP. If $u_{sav}$ is different from $u_{cur}$, the warm-up of this data unit fails, and the warm-up must be attempted again. This test ensures that writing actions of process $\sigma^{SP}$ directed to data unit $d_i^{SP}$ during steps 3, 4, 5 and 6 before a new content was written can be detected (by other processes, e.g. $\sigma$).

In step 7 of FIG. 4 the auxiliary process $W_h^{SP}$ of the spare unit SP acknowledges a successful warm-up to the kernel process $W_m^{SP}$ of the spare unit. If it was not the question of the last data unit to be transferred, $W_m^{SP}$ continues from step 1, in other case the warm-up ends.

It must be noted that in steps 4 and 5 several messages may be transferred if it does not take so much time that a real-time problem arises. This enables the data units to be larger than the maximum length of a message. Since the warm-up takes relatively long, the warm-up procedure must be run in the background of the applications owing to the real-time requirements. For meeting this requirement and for minimizing the warm-up time for a single data unit, for ensuring the safety period discussed in step 6, and thus for maximizing the probability of a successful warm-up, the following priorities are used when the processes are executed:

$$\text{pri}(W_m) \leq \text{pri}(\text{applications}) < \text{pri}(W_h).$$

This rule ensures that process $\sigma^{SP}$ can not do anything e.g. during steps 2 and 3.

In such a system in which the warm-up entities contain several main memory files to which several processes have a reading and writing access the warm-up entities are warmed up in such an order that the readers of the data are warmed up after the writers and the actual main memory files have been warmed up.

The figures and the explanation associated therewith are only intended to illustrate the present invention. The method of the invention may vary in its details within the scope of the attached claims.

We claim:

1. A method for warming up a spare process in parallel with an active process in a replicated real-time system, in particular in a telephone exchange, the system comprising a control means that comprises at least one active control unit having a replicating hot-standby spare unit so that the spare unit performs the same processes as the active control unit in parallel, the method comprising:

temporarily freezing the operation of the active process to be replicated in the active control unit, simultaneously keeping other processes of the active control unit in operation;

sending the copies of task requests in a queue of the active process to the spare unit, and recording in the active unit which task requests have been sent;

recording the task requests incoming during the freezing state of the active process in the task request queue of the process;

collecting state data to be sent, and sending the collected state data to the spare unit in one or more batches;

creating a spare process for the active process in the spare unit;

loading the state data contained by a first batch of state data sent to the spare process;

loading said copies of the task requests to a task request queue of the spare process in the same order as they were in the task request queue of the active process;

sending an acknowledgement to the active control unit;

checking that no new task requests have come in to the active process in addition to those the copies of which were sent to the spare unit; and considering the freezing to be successful if no new task requests have arrived, and considering the freezing failed if new task requests have arrived.

2. A method for warming up a spare process in parallel with an active process in a replicated real-time system, in particular in a telephone exchange, the system comprising a control means that comprises at least one active control unit having a replicating hot-standby spare unit so that the spare unit performs the same processes as the active control unit in parallel, the method comprising:

temporarily freezing the operation of the active process, simultaneously keeping other processes of the active control unit in operation;

recording task requests incoming during the freezing state of the active process in a task request queue of the process;

collecting state data of the active process to be sent;

sending the collected state data to the spare unit in one or more batches;

creating a spare process for the active process in the spare unit;

loading the state data contained by a first batch of state data sent to the spare process;

sending an acknowledgement to the active control unit; and checking whether the active process has any task requests and considering the freezing to be successful if the active process has no task requests, and considering the freezing to have failed if the active process has task requests.

3. A method as claimed in claim 1, wherein the active control unit and the spare unit are connected to an internal data transmission means of the control means and that said task requests are messages and the task request queues are message queues.

4. A method as claimed in claim 3, wherein the check of the task requests of the active process comprises a check of an incoming message queue of the active process, whereby the active process is considered to have no task requests if the incoming message queue is empty, and the active process is considered to have task requests if there are messages in the incoming message queue.

5. A method as claimed in claim 4, wherein messages which are received in the incoming message queue of the active process during the freezing state and/or messages which are in the incoming message queue at the beginning of the freezing state are processed after the termination of the freezing state.

6. A method as claimed in claim 4, wherein, after a failed warm-up of the spare process, an error message is sent to the spare unit, the spare process is returned to an initial state and a new warm-up effort is made at an appropriate moment.

7. A method as claimed in claim 4, wherein, after a successful warm-up, the active process is kept in the freezing state, and more state data batches containing said collected state data are sent from the active control unit to the spare unit until all of the collected state data has been sent and the state of the spare process has brought to be consistent with the active process, whereby the freezing of the active process terminates, and the active process is returned to a kernel state which existed prior to starting the warm-up, whereby the active process may perform normal tasks in accordance with the arrived or arriving messages, and that the spare process is simultaneously set from the freezing state to the normal operative state.

8. A method as claimed in claim 4, wherein, after a successful freezing, the same messages are received in the incoming message queue of the spare process as in the incoming message queue of the active process.

9. A method as claimed in claim 1, wherein, after a successful warm-up of the state data, a transfer of separate active data units is carried out from the active control unit to the spare unit, said separate data units being data units which are not used for changing state variables of the process or for creating a content for an internal message which is sent to another process.

10. A method as claimed in claim 9, wherein the transfer of the separate data units comprises:

recording in the spare unit the current value of a separate data unit to be transferred;

requesting the active control unit to send said separate data unit to the spare unit;

reading said separate data unit in the active control unit and sending it to the spare unit;

ensuring that no writing action directed to the data unit have occurred during the transfer phase, by comparing the current value of the data unit in the spare unit with said recorded value; and if the current value and the recorded value of the data unit are equal, writing the value of the data unit received from the active control unit as the current value of the data unit of the spare unit, if the current value and the recorded value of the data unit are different, defining the transfer as failed, and rejecting the value of the data unit received from the active control unit.

11. A method as claimed in claim 9, wherein a transfer of separate data units comprises:

requesting the active control unit to send said separate data unit to the spare unit;

reading said separate data unit in the active control unit and sending it to the spare unit;

checking whether writing actions directed to the data unit have occurred in the spare unit during the transfer phase;

writing the value of the data unit received from the active control unit as the current value of the data unit of the spare unit if no writing actions have occurred; and defining the transfer as failed, and rejecting the value of the data unit received from the active control unit, if writing operations have occurred.

12. A method as claimed in claim 9, wherein the separate data units comprise charging and/or statistical data of the system.

13. A method as claimed in claim 1, wherein, in such a system in which the warm-up entities contain several main memory files to which several processes have reading and writing access, the warm-up entities are warmed up in such an order that the readers of the data are warmed up after the writers and the actual main memory files have been warmed up.

14. A method as claimed in claim 1, wherein the real-time system is a telephone exchange, comprising switching means via which connections may be switched selectively between a first transmission channel group and a second transmission channel group, and that said control means is a switch control means, which comprises at least one active control unit connected with the internal data transmission means of the switch control means, said control unit having, permanently or when necessary a replicating hot-standby spare unit connected with said data transmission means, so that the spare unit performs in parallel the same switch control processes as the active control unit.

* * * * *